(12) United States Patent
Lu et al.

(10) Patent No.: US 10,080,028 B2
(45) Date of Patent: Sep. 18, 2018

(54) SYSTEM AND METHOD OF COMPENSATING FOR IMAGE COMPRESSION ERRORS

(71) Applicant: Samsung Display Co., Ltd., Yongin, Gyeonggi-Do (KR)

(72) Inventors: Ning Lu, Saratoga, CA (US); Dihong Tian, San Jose, CA (US)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/944,116

(22) Filed: Nov. 17, 2015

(65) Prior Publication Data

US 2016/0150247 A1 May 26, 2016

Related U.S. Application Data

(60) Provisional application No. 62/085,146, filed on Nov. 26, 2014.

(51) Int. Cl.
*G06K 9/36* (2006.01)
*H04N 19/503* (2014.01)

(52) U.S. Cl.
CPC ....... *H04N 19/503* (2014.11); *G09G 2340/02* (2013.01)

(58) Field of Classification Search
CPC .... H04N 19/89; H04N 19/187; H04N 19/895; H04N 19/36; H04N 19/136; H04N 9/8042; H04N 1/4052
See application file for complete search history.

(56) References Cited

U.S. PATENT DOCUMENTS

| | | | |
|---|---|---|---|
| 5,598,354 A | * | 1/1997 | Fang .................... G06N 3/0454 708/203 |
| 5,668,599 A | | 9/1997 | Cheney et al. |
| 5,799,111 A | * | 8/1998 | Guissin .................. H04N 19/86 358/447 |

(Continued)

FOREIGN PATENT DOCUMENTS

EP  1298937 A1  4/2003

*Primary Examiner* — Eueng-Nan Yeh
(74) *Attorney, Agent, or Firm* — Innovation Counsel LLP

(57) ABSTRACT

A method of compensating for image compression errors is presented. The method comprises: receiving an image frame $F_n$ during a frame period n, where n is a natural number; adding a compensation frame $C_n$ to the image frame $F_n$ to generate a compensated frame $E_n$; compressing the compensated frame $E_n$ to generate a compressed frame $CE_n$; decompressing the compressed frame $CE_n$ to generate a decompressed frame $D_n$; and subtracting the decompressed frame $D_n$ from the compensated frame $E_n$ to generate a next compensation frame $C_{n+1}$.

20 Claims, 5 Drawing Sheets

(56) References Cited

U.S. PATENT DOCUMENTS

| | | | |
|---|---|---|---|
| 6,198,773 B1 * | 3/2001 | Gill | H04N 19/61 348/716 |
| 2011/0078536 A1 | 3/2011 | Han et al. | |
| 2014/0204105 A1 | 7/2014 | Fang et al. | |
| 2014/0328387 A1 | 11/2014 | Puri et al. | |
| 2014/0354826 A1 | 12/2014 | Kolarov et al. | |

* cited by examiner

SYSTEM AND METHOD OF COMPENSATING FOR IMAGE COMPRESSION ERRORS

CROSS-REFERENCE TO RELATED APPLICATIONS

This application claims priority to and the benefit of U.S. Provisional Patent Application No. 62/085,146 titled "FRAME COMPRESSION USING TEMPORAL COMPENSATION FOR HIGH QUALITY DISPLAY" that was filed on Nov. 26, 2014, the entire content of which is incorporated herein by reference.

RELATED FIELD

The present disclosure relates to a system and method of reducing image compression errors.

BACKGROUND

As the resolution of display devices increases, so does the amount of display data, which increases exponentially. This increase in display data generally translates to an increase in the storage and physical size of the frame buffer memory of a display device. For example, a Quad High Definition (QHD) display having an 11 MB SRAM frame buffer may occupy an area of roughly 88 mm² when fabricated using 65 nm process technology.

Display data compression may be used to significantly reduce the size required of the frame buffer, resulting in major cost and power savings. A 2:1 compression rate is recently being used for production display devices, and the Video Electronics Standards Association (VESA) is trying to push the compression rate up to 4:1. Although compression rates higher than 4:1 may be possible, resulting compression errors may generate visual artifacts for certain images.

Accordingly, in view of the foregoing, there exists a need for a system and method of compensating for image compression errors to improve the image quality of the displayed images.

SUMMARY

The present disclosure provides a method of compensating for image compression errors. According to an exemplary embodiment, the method comprises: receiving an image frame $F_n$ during a frame period n, where n is a natural number; adding a compensation frame $C_n$ to the image frame $F_n$ to generate a compensated frame $E_n$; compressing the compensated frame $E_n$ to generate a compressed frame $CE_n$; decompressing the compressed frame $CE_n$ to generate a decompressed frame $D_n$; and subtracting the decompressed frame $D_n$ from the compensated frame $E_n$ to generate a next compensation frame $C_{n+1}$.

The present disclosure also provides a system of compensating for image compression errors. According to an exemplary embodiment, the system comprises: an encoding part configured to receive an image frame $F_n$ during a frame period n, where n is a natural number; a summation unit configured to add a compensation frame $C_n$ to the image frame $F_n$ to generate a compensated frame $E_n$; an encoder configured to compress the compensated frame $E_n$ to generate a compressed frame $CE_n$; a decoder configured to decompress the compressed frame $CE_n$ to generate a decompressed frame $D_n$; and a compensation unit configured to subtract the decompressed frame $D_n$ from the compensated frame $E_n$ to generate a next compensation frame $C_{n+1}$.

The present disclosure also provides a display device that compensates for image compression errors. According to an exemplary embodiment, the display device comprises an encoding part configured to receive an image frame $F_n$ during a frame period n, where n is a natural number. The encoding part includes a summation unit configured to add a compensation frame $C_n$ to the image frame $F_n$ to generate a compensated frame $E_n$, an encoder configured to compress the compensated frame $E_n$ to generate a compressed frame $CE_n$, a first decoder configured to decompress the compressed frame $CE_n$ to generate a decompressed frame $D_n$, and a compensation unit configured to subtract the decompressed frame $D_n$ from the compensated frame $E_n$ to generate a next compensation frame $C_{n+1}$. The display device further comprises: a frame buffer memory configured to store the compressed frame $CE_n$, a second decoder configured to receive the compressed frame $CE_n$ from the frame buffer memory and decompress the received compressed frame $CE_n$ to generate a display frame equal to the decompressed frame $D_n$, and a display panel configured to display the display frame.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
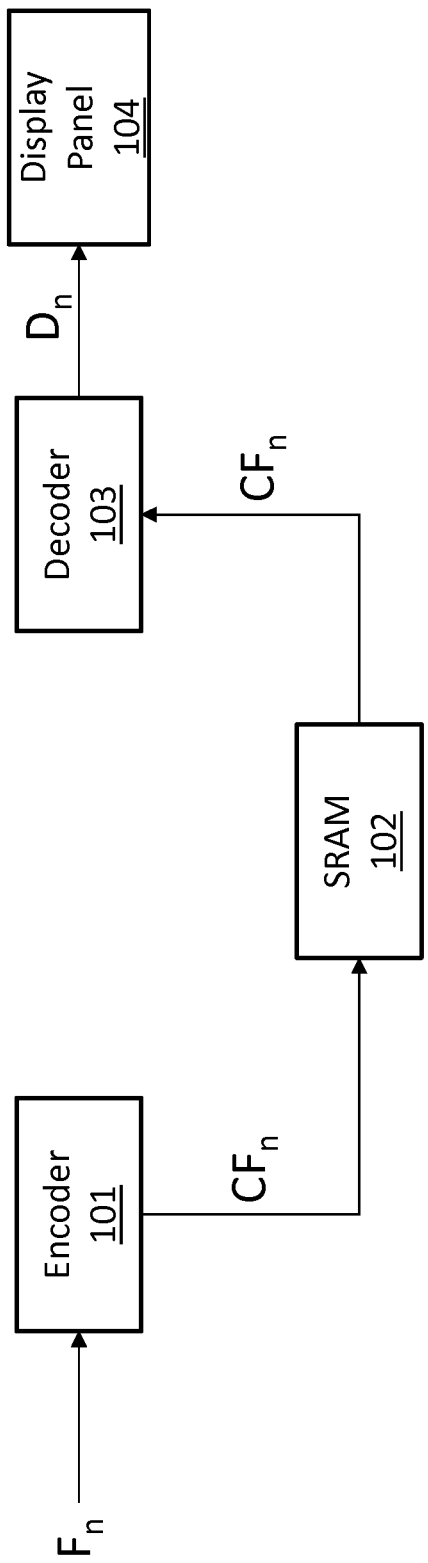
FIG. 1 illustrates a traditional implementation of buffering compressed image frames.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As mentioned earlier, compressing and then decompressing display data often introduces compression errors and loss in the decompressed display data. To illustrate, consider the example of FIG. 1 in which a traditional implementation of buffering compressed image frames is shown. As used herein, a "frame" refers to display data for rendering a still image. To add further context, a video generally comprises a plurality of frames that are displayed in quick succession, e.g., at a frame rate of 60 or 120 Hz.

According to the implementation of FIG. 1, a current frame $F_n$ is compressed by an encoder 101 and then stored in an SRAM 102. Next, when it is time to display the frame $F_n$, the compressed frame $CF_n$ is retrieved from the SRAM 102 and decompressed by a decoder 103 to generate a decompressed frame $D_n$. A display panel 104 receives and displays the decompressed frame $D_n$.

In other words, the implementation of FIG. 1 uses a compression technique (e.g., intra-frame coding) to compress the current frame $F_n$ so that the storage size of the frame buffer memory—in this case, the SRAM 102—may be reduced. However, because the compression and decompression processes introduce errors and loss, the decompressed frame $D_n$ has a lower image quality than the frame $F_n$. In general, the higher the compression rate is used, the greater the difference is in the quality between the decompressed frame $D_n$ and the original frame $F_n$. Thus, under the implementation of FIG. 1, the display image quality is limited by the still image compression rate.

To illustrate these limitations quantitatively, consider a case in which a static image F is repeatedly sent for display as n successive frames (i.e., $F=F_1=F_2=\ldots=F_n$), n being a natural number, and the display panel 104 displays the decompressed frame D (i.e., $D=D_1=D_2=\ldots=D_n$) repeatedly at its refresh rate. Thus, if the still image F is repeatedly sent for display at 60 frames per second, the decompressed image D is displayed 60 times, and the average error |F−D| per frame is:

$$\text{Average}(F - D) = \frac{1}{60}\left|\sum_{n=1}^{60}(F_n - D_n)\right| = |F - D|, \quad \text{Equation (1)}$$

where $F=F_1=F_2=\ldots=F_{60}$ and $D=D_1=D_2=\ldots=D_{60}$. What this means is that the compression error for each displayed frame D remains the same from one frame to the next, and the image quality of the displayed frames D is limited by the still image compression rate. In contrast with the traditional implementation of FIG. 1, the present system and method enable reduction of the frame buffer memory size while providing a superior image quality by incorporating temporal compensation as part of the image compression.

Figure 2:
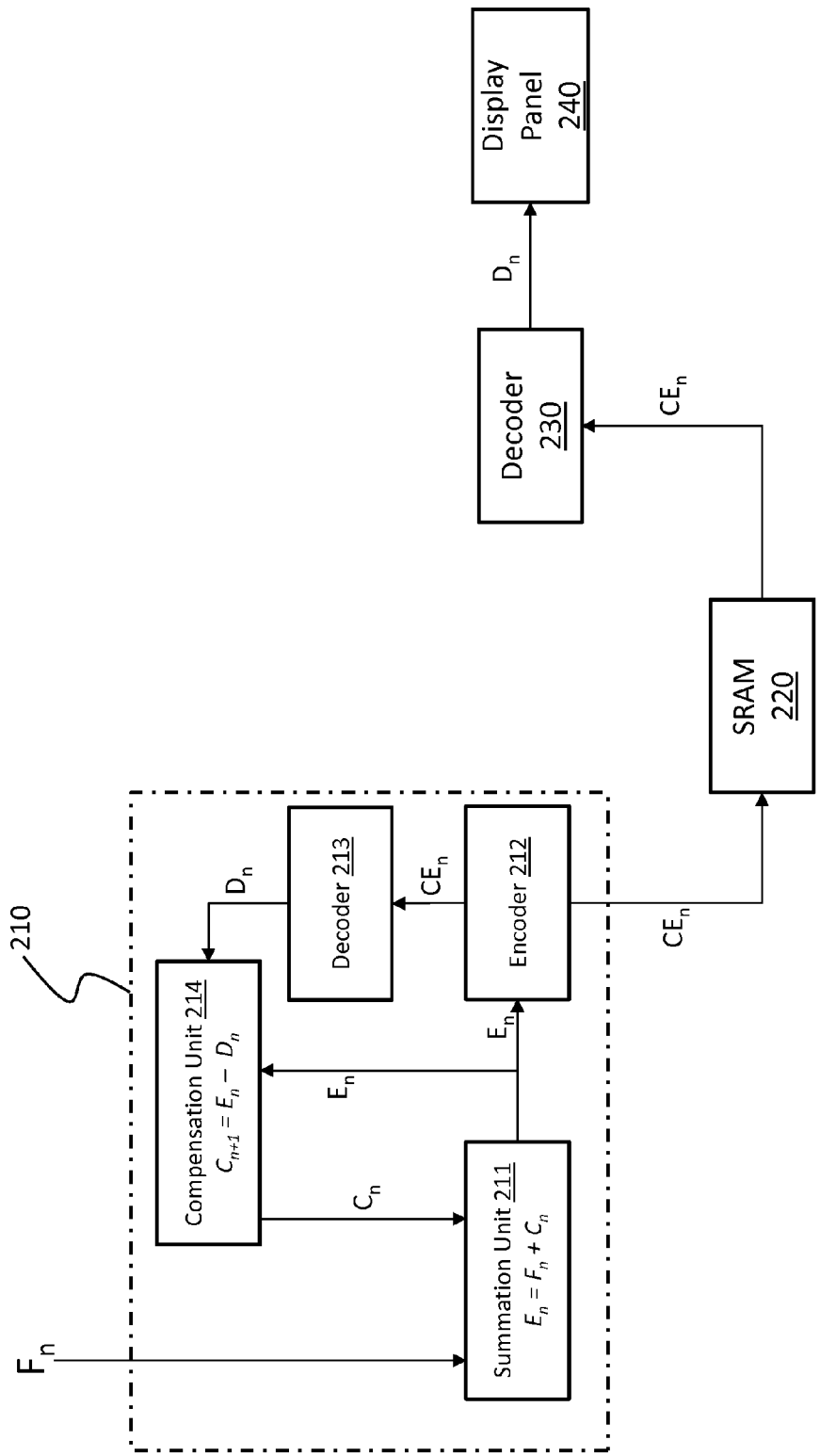
FIG. 2 illustrates an exemplary implementation of the present system and method, according to an embodiment.

FIG. 2 illustrates an exemplary implementation of the present system and method, according to an embodiment. Unlike the encoding part of FIG. 1, which includes only an encoder 101, an encoding part 210 of FIG. 2 includes a summation unit 211, an encoder 212, a decoder 213, and a compensation unit 214. The encoding part 210 receives a current frame $F_n$ during a frame period n, where n is a natural number, adds a compensation frame to the frame $F_n$, and outputs a compressed frame $CE_n$ to an SRAM 220. The encoding part 210, for example, may be implemented by an application processor, such as a Graphics Processing Unit (GPU).

Then, similar to the implementation of FIG. 1, when it is time to display the frame $F_n$, the compressed frame $CE_n$ is retrieved from the SRAM 220 and decompressed by a decoder 230 to generate a decompressed frame $D_n$. A display panel 240 receives and displays the decompressed frame $D_n$. Thus, a difference between the implementation of FIG. 1 and that of FIG. 2 lies in the encoding part 210.

The encoding part 210 is configured to receive the frame $F_n$ and provide it as an input to the summation unit 211 during the frame period n. The summation unit 211, which also receives a compensation frame $C_n$ from the compensation unit 214, is configured to add the compensation frame $C_n$ to the image frame $F_n$ to generate a compensated frame $E_n$ that is output to the encoder 212 and the compensation unit 214. The encoder 212 is configured to compress the compensated frame $E_n$ to generate the compressed frame $CE_n$, which may then be stored in the SRAM 220.

The decoder 213 is configured to receive and decompress the compressed frame $CE_n$ to generate a decompressed frame $D_n$. The compensation unit 214 is configured to receive the decompressed frame $D_n$ and subtract it from the compensated frame $E_n$ to generate a compensated frame $C_{n+1}$ for use in a next frame period n+1 by the summation unit 211 to generate a compensated frame $E_{n+1}$. If there is no previous compensated frame $E_{n-1}$ from which $C_n$ can be generated (e.g., if the frame period n=1 is the initial frame period, and frame $F_1$ is the initial frame received by the encoding part 210), the compensation unit 214 may be configured to output an effectively zero value as $C_n$ such that $E_n=F_n$.

What this means is that, under the implementation of FIG. 2, the encoding part 210 determines the difference between the compensated frame $E_n$ and the decompressed frame $D_n$, and then adds that difference as a compensation frame $C_{n+1}$ to the next received frame $F_{n+1}$ to generate the next compensated frame $E_{n+1}$. In this way, the encoding part 210 is able to temporally carry the compression error from the current frame forward to offset the compression error in the next frame.

To illustrate the advantages of the implementation of FIG. 2 quantitatively, consider the same case as above in which a static image F is repeatedly sent for display as n successive frames (i.e., $F=F_1=F_2=\ldots=F_n$), n being a natural number, and the display panel 240 displays the decompressed frame D (i.e., $D=D_1=D_2=\ldots=D_n$) repeatedly at its refresh rate. Thus, if the still image F is repeatedly sent for display at 60 frames per second, the decompressed image D is displayed 60 times, and the average error |F−D| per frame is again given by Equation (1) above. However, under the implementation of FIG. 2, the following equalities apply:

for $n=1$, $E_1=F_1$ and $C_1=0$; and for $n>1$, $E_n=F_n+C_n$ and $C_{n-1}-D_{n-1} \rightarrow E_n=F_n+(E_{n-1}-D_{n-1})$.

Applying these equalities to Equation (1) reduces it to Equation (2):

$$\text{Average}(F - D) = \frac{1}{60}\left|\sum_{n=1}^{60}(F_n - D_n)\right| = |F - D| \quad \text{Equation (1)}$$

$$= \frac{1}{60}|E_{60} - D_{60}| = \frac{1}{60}|C_{61}| \quad \text{Equation (2)}$$

What Equation (2) suggests is that, under the implementation of FIG. 2, the average compression error is effectively distributed temporally across the 60 successively displayed frames and is significantly smaller than the average compression error of each frame that results under the implementation of FIG. 1. Hence, for display panels of higher refresh rate, the benefit would be even greater because the compression error would be distributed across more frames per second.

Figure 3A:
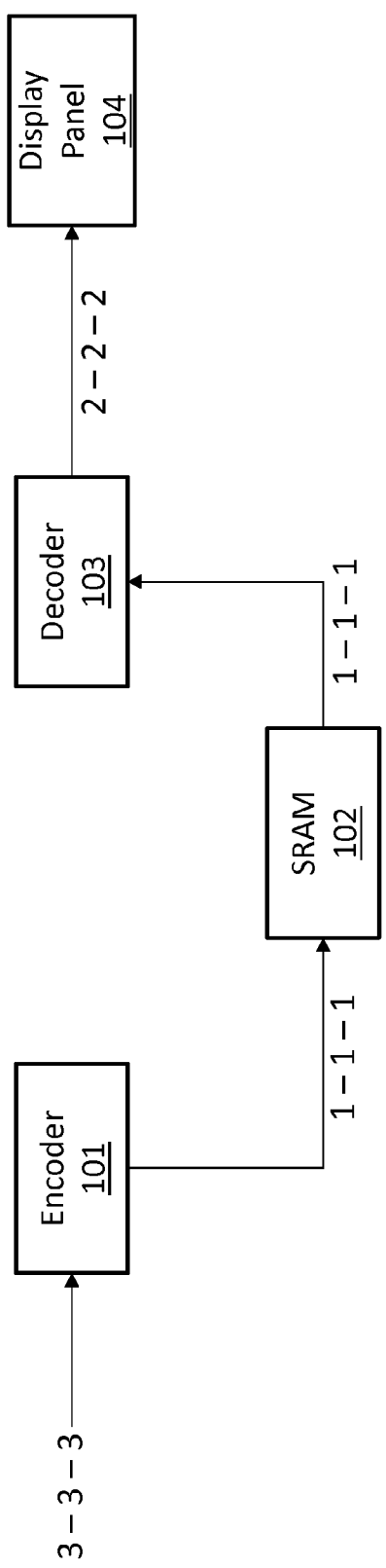
FIG. 3A illustrates an example of the average compression error that may result under the traditional implementation of FIG. 1.
Figure 3B:
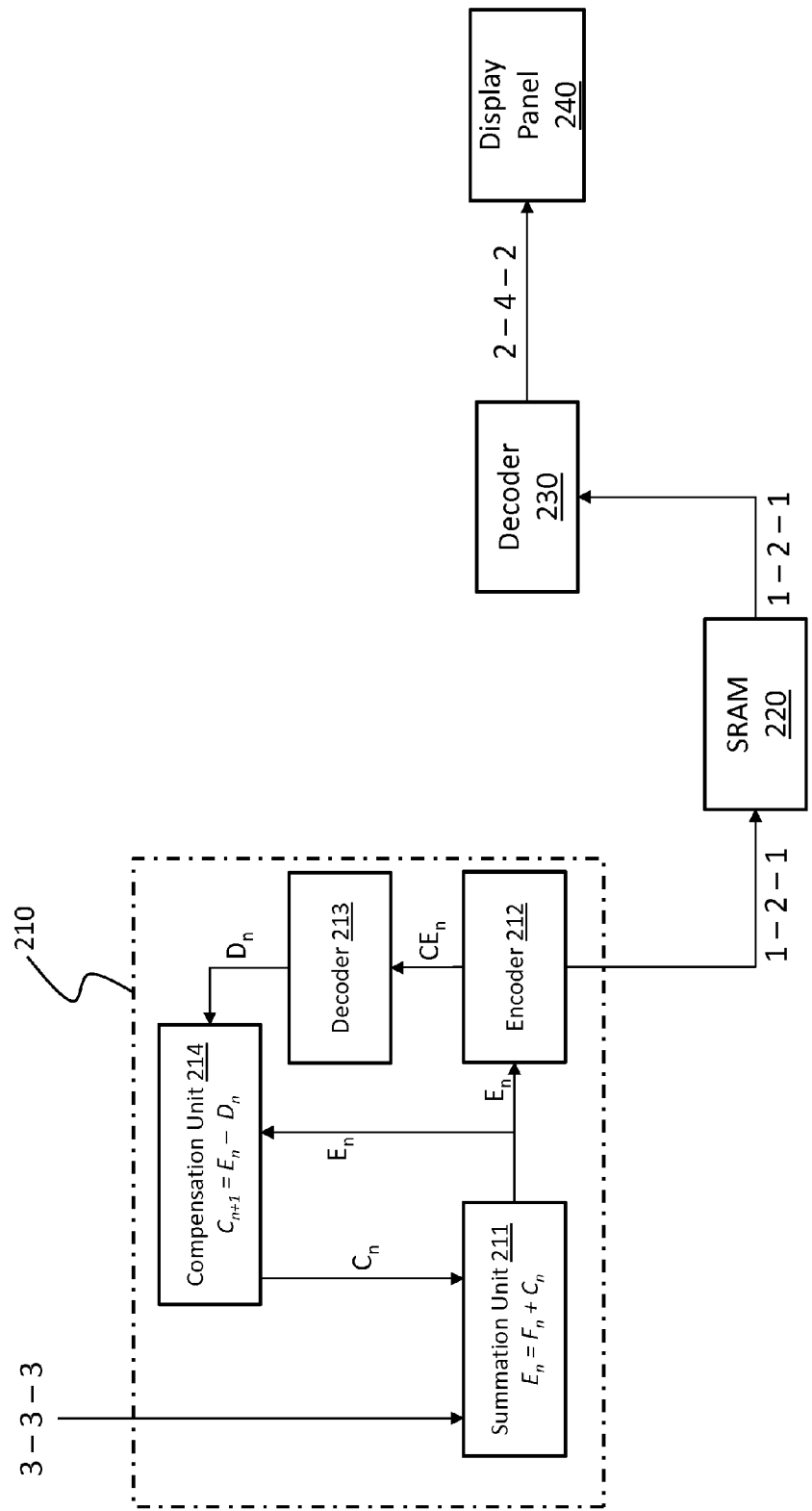
FIG. 3B illustrates an example of the average compression error that may result under the exemplary implementation of FIG. 2.

FIGS. 3A and 3B further illustrate the advantages of the present system and method using simplified representations of the frame data and compression/decompression processes. In particular, FIG. 3A illustrates an example of the average compression error that may result under the traditional implementation of FIG. 1, and FIG. 3B illustrates an example of the average compression error that may result under the exemplary implementation of FIG. 2.

In FIGS. 3A and 3B, the frame data of each received frame is represented by an integer value of 3, the compression process is represented by an integer division by two (hereinafter, simply "/2"), and the decompression process is represented by an integer multiplication by two (hereinafter, simply "×2"). These simple representations are chosen for their simplicity to help showcase the advantages of the present system and method. However, the present system and method are not limited by these representations and may be applied to frame data and compression/decompression processes that are much more extensive and/or complex to achieve the advantages described herein.

Referring to FIG. 3A, three frames each having a value of 3 (3-3-3) are successively received and compressed by the encoder 101, which performs integer division by two, to generate successive compressed frames of 1-1-1. The compressed values 1-1-1 are retrieved and decompressed by the decoder 103, which performs integer multiplication by two, to generate successive decompressed frames 2-2-2. Thus, under the implementation of FIG. 1, the average compression error is equal to 1:

$$\frac{1}{3}[(3-2)+(3-2)+(3-2)] = \frac{3}{3} = 1$$

Referring to FIG. 3B, three frames each having a value of 3 (3-3-3) are successively received and compressed by the encoding part 210. In response to the first received frame $F_1=3$, the encoding part outputs a first compressed frame $CE_1=1$ (i.e., $C_1=0$; $E_1=F_1+C_1=3+0=3$; so $CE_1=E_1/2=3/2=1$). In this case $C_1$ is 0 since $F_1$ is the first frame. Since $E_1$ is equal to $F_1+C_1$, $E_1=3$. $CE_1$ is equal to $E_1/2$ and is therefore 1. Thus, the value 1 is stored in SRAM 220 and, when decoded, $D_1$ is equal to 2. In response to the second received frame $F_2=3$, the encoding part 210 outputs a second compressed frame $CE_2=2$ (i.e., $C_2=E_1-D_1=E_2-CE_1\times2=3-1\times2=1$; $E_2=F_2+C_2=3+1=4$; so $CE_2=E_2/2=4/2=2$). In this case, $E_2$ is equal to 4 since $C_2$ is equal to $E_1$ (3) minus $D_1$ (2), which equals 1, and $F_2=3$. $E_2$ is then encoded to $CE_2=2$, and decoded $D_2$ is equal to 4. In response to the third received frame $F_3=3$, the encoding part outputs a third compressed frame $CE_3=1$ (i.e., $C_3=E_2-D_2=E_2-CE_2\times2=4-2\times2=0$; $E_3=F_3+C_3=3+0=3$; so $CE_3=E_3/2=3/2=1$). In this case, $E_3$ is equal to 3 since $C_3$ is equal to $E_2$ (4) minus $D_2$ (4), which equals 0, and $F_3=3$. $E_3$ is then encoded to $CE_3=1$, and decoded $D_3$ is equal to 2. Thus, the encode part 210 generates and outputs successive compressed frames 1-2-1. The compressed frames 1-2-1 are retrieved and decompressed by the decoder 230, which performs integer multiplication by two, to generate successive decompressed frames 2-4-2.

Thus, under the implementation of FIG. 2, the average compression error is equal to ⅓:

$$\frac{1}{3}[(3-2)+(3-4)+(3-2)] = \frac{1}{3}(1-1+1) = \frac{1}{3}$$

Accordingly, the average compression error that results under the present system and method according to exemplary implementation of FIG. 2 is significantly smaller than the average compression error that results under the traditional implementation of FIG. 1.

Figure 4:
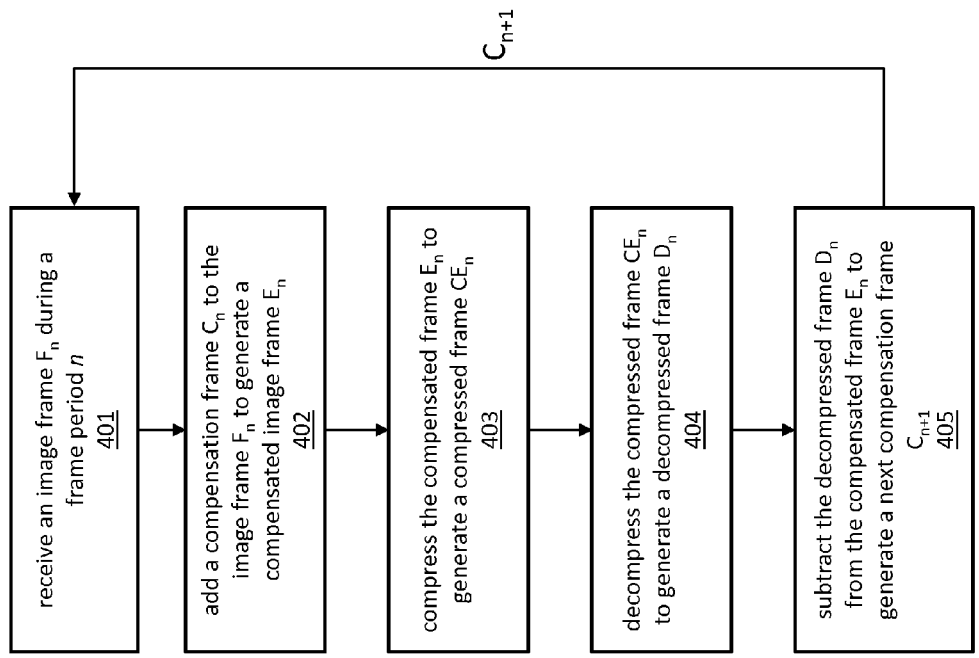
FIG. 4 illustrates a flow chart of the exemplary operations of the encoding part of FIG. 2, according to an embodiment.

As a recap, FIG. 4 shows a flow chart of the exemplary operations of the encoding part of FIG. 2, according to an embodiment. The encoding part receives an image frame $F_n$ during a frame period n, where n is a natural number (401). The encoding part adds a compensation frame $C_n$ to the image frame $F_n$ to generate a compensated frame $E_n$ (402). The encoding part compresses the compensated frame $E_n$ to generate a compressed frame $CE_n$ (403). The encoding part decompresses the compressed frame $CE_n$ to generate a decompressed frame $D_n$ (404). The encoding part then subtracts the decompressed frame $D_n$ from the compensated frame $E_n$ to generate a next compensation frame $C_{n+1}$ (405). The next compensation frame $C_{n+1}$ is used by the encoding part in a next frame period n+1 when a next image frame $F_{n+1}$ is received again at (401).

In some embodiments, the compensation frame $C_n$ may be a weighted added to the compensated frame $E_n$. For example, when calculating the compensated image frame $E_n$, the compensation frame $C_n$ may be weighted as follows:

$E_n=F_n+\lambda\times C_n$, where $\lambda$ is a weighting factor $\epsilon 0\leq\lambda\leq1$.

The value of $\lambda$ may be any value between 0 and 1 inclusive. If $\lambda=0$, no compensation is provided. If $\lambda=1$, full compensation is provided. Chosen values of $\lambda$ may include, for example, ¾, ⅞, or 15/16. The value of $\lambda$ may be chosen according to a frame rate at which the image frames are to be displayed by the display panel. The value of $\lambda$ may be dynamically variable depending on motion detection or frame parity. For example, the value of $\lambda$ may dynamically vary from one frame to the next according to a signal-to-noise ratio between the current image frame $F_n$ and a previous image frame $F_{n-1}$. Generally, the larger the parity is between frames, the less compensation is needed.

Furthermore, in some embodiments, a predefined zero-sum random noise may be added to the compensated frame $E_n$ prior to being compressed to avoid flickering patterns of periodicity that may be generated by error compensation. In some embodiments, the zero-sum random noise may be added to the decompressed frame $D_n$ prior to being displayed by the display panel.

Thus, in summary, the present disclosure introduces a new process of adding temporal compensation that enables reduction of the frame buffer memory size, e.g., a compression rate of up to 8:1, while providing high quality image frames for display on a display panel.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of compensating for image compression errors in a display device by estimating a compression error in the form of a compensation frame from a current image frame and using the compensation frame to offset compression error of a subsequent image frame, the method comprising:
   receiving an image frame $F_n$ during a frame period n, where n is a natural number;
   adding a compensation frame $C_n$ to the image frame $F_n$ to generate a compensated frame $E_n$;
   compressing the compensated frame $E_n$ to generate a compressed frame $CE_n$;
   decompressing the compressed frame $CE_n$ to generate a decompressed frame $D_n$;
   subtracting the decompressed frame $D_n$ from the compensated frame $E_n$ to generate a next compensation frame $C_{n+1}$; and
   displaying on a display panel a display frame equal to the decompressed frame $D_n$, wherein the display frame is a high-quality image frame including a compression error offset.

2. The method of claim 1 further comprising:
   receiving an image frame $F_{n+1}$ during a next frame period n+1;
   adding the compensation frame $C_{n+1}$ to the image frame $F_{n+1}$ to generate a compensated frame $E_{n+1}$;
   compressing the compensated frame $E_{n+1}$ to generate a compressed frame $CE_{n+1}$;
   decompressing the compressed frame $CE_{n+1}$ to generate a decompressed frame $D_{n+1}$; and
   subtracting the decompressed frame $D_{n+1}$ from the compensated frame $E_{n+1}$ to generate a next compensation frame $C_{n+2}$.

3. The method of claim 1 further comprising:
   outputting the compressed frame $CE_n$ to a frame buffer memory.

4. The method of claim 1, wherein n=1 is an initial period, and an initial compensated $E_1$ is equal to an initial image frame $F_1$ received during the initial frame period, and the value of an initial compensation frame $C_1$ is effectively zero.

5. The method of claim 1, wherein the compensation frame $C_n$ is a weighted addend, and the compensated frame $E_n$ is generated according to the expression:

$$E_n = F_n + \lambda \times C_n, \text{ where } \lambda \text{ is a weighting factor } \epsilon 0 \leq \lambda \leq 1.$$

6. The method of claim 5, further comprising selecting a value for $\lambda$ according to a frame rate at which received image frames are displayed.

7. The method of claim 5, wherein the value for $\lambda$ may be dynamically variable from one frame to the next according to a signal-to-noise ratio between the image frame Fn and a previous image frame Fn−1.

8. A system of compensating for image compression errors in a display device by estimating a compression error in the form of a compensation frame from a current image frame and using the compensation frame to offset compression error of a subsequent image frame, the system comprising:
   an encoding part configured to receive an image frame $F_n$ during a frame period n, where n is a natural number;
   a summation unit configured to add a compensation frame $C_n$ to the image frame $F_n$ to generate a compensated frame $E_n$;
   an encoder configured to compress the compensated frame $E_n$ to generate a compressed frame $CE_n$;
   a decoder configured to decompress the compressed frame $CE_n$ to generate a decompressed frame $D_n$;
   a compensation unit configured to subtract the decompressed frame $D_n$ from the compensated frame $E_n$ to generate a next compensation frame $C_{n+1}$; and
   a display panel configured to display a display frame equal to the decompressed frame $D_n$, wherein the display frame is a high-quality image frame including a compression error offset.

9. The system of claim 8, wherein:
   the encoding part is further configured to receive an image frame $F_{n+1}$ during a next frame period n+1;
   the summation unit is further configured to add the compensation frame $C_{n+1}$ to the image frame $F_{n+1}$ to generate a compensated frame $E_{n+1}$;
   the encoder is further configured to compress the compensated frame $E_{n+1}$ to generate a compressed frame $CE_{n+1}$;
   the decoder is further configured to decompress the compressed frame $CE_{n+1}$ to generate a decompressed frame $D_{n+1}$; and the compensation unit is further configured to subtract the decompressed frame $D_{n+1}$ from the compensated frame $E_{n+1}$ to generate a next compensation frame $C_{n+2}$.

10. The system of claim 8, wherein the encoder is further configured to output the compressed frame $CE_n$ to a frame buffer memory.

11. The system of claim 8, wherein n=1 is an initial period, and an initial compensated $E_1$ is equal to an initial image frame $F_1$ received during the initial frame period, and the value of an initial compensation frame $C_1$ is effectively zero.

12. The system of claim 8, wherein the compensation frame $C_n$ is a weighted addend, and the compensated frame $E_n$ is generated according to the expression:

$E_n = F_n + \lambda \times C_n$, where $\lambda$ is a weighting factor $\epsilon 0 \leq \lambda \leq 1$.

13. The system of claim 12, wherein the value for $\lambda$ is selected according to a frame rate at which received image frames are displayed.

14. The system of claim 12, wherein the value for $\lambda$ may be dynamically variable from one frame to the next according to a signal-to-noise ratio between the image frame Fn and a previous image frame Fn−1.

15. A display device that compensates for image compression errors by estimating a compression error in the form of a compensation frame from a current image frame and using the compensation frame to offset compression error of a subsequent image frame, the display device comprising:
an encoding part configured to receive an image frame $F_n$ during a frame period n, where n is a natural number, the encoding part comprising:
a summation unit configured to add a compensation frame $C_n$ to the image frame $F_n$ to generate a compensated frame $E_n$,
an encoder configured to compress the compensated frame $E_n$ to generate a compressed frame $CE_n$,
a first decoder configured to decompress the compressed frame $CE_n$ to generate a decompressed frame $D_n$, and
a compensation unit configured to subtract the decompressed frame $D_n$ from the compensated frame $E_n$ to generate a next compensation frame $C_{n+1}$;
a frame buffer memory configured to store the compressed frame $CE_n$;
a second decoder configured to receive the compressed frame $CE_n$ from the frame buffer memory and decompress the received compressed frame $CE_n$ to generate a display frame equal to the decompressed frame $D_n$; and
a display panel configured to display the display frame, wherein the display frame is a high-quality image frame including a compression error offset.

16. The display device of claim 15, wherein:
the encoding part is further configured to receive an image frame $F_{n+1}$ during a next frame period n+1;
the summation unit is further configured to add the compensation frame $C_{n+1}$ to the image frame $F_{n+1}$ to generate a compensated frame $E_{n+1}$;
the encoder is further configured to compress the compensated frame $E_{n+1}$ to generate a compressed frame $CE_{n+1}$;
the first decoder is further configured to decompress the compressed frame $CE_{n+1}$ to generate a decompressed frame $D_{n+1}$; and
the compensation unit is further configured to subtract the decompressed frame $D_{n+1}$ from the compensated frame $E_{n+1}$ to generate a next compensation frame $C_{n+2}$.

17. The display device of claim 15, wherein the encoder is further configured to output the compressed frame $CE_n$ to the frame buffer memory.

18. The display device of claim 15, wherein n=1 is an initial period, and an initial compensated $E_1$ is equal to an initial image frame $F_1$ received during the initial frame period, and the value of an initial compensation frame $C_1$ is effectively zero.

19. The display device of claim 15, wherein the compensation frame $C_n$ is a weighted addend, and the compensated frame $E_n$ is generated according to the expression:

$E_n = F_n + \lambda \times C_n$, where $\lambda$ is a weighting factor $\epsilon 0 \leq \lambda \leq 1$.

20. The display device of claim 19, wherein the value for $\lambda$ is selected according to a frame rate at which received image frames are displayed by the display panel.

* * * * *